May 13, 1958 R. W. REID ET AL 2,834,826
CONDUCTIVELY COATED ELECTRODES AND METHOD OF MAKING SAME
Filed June 30, 1954
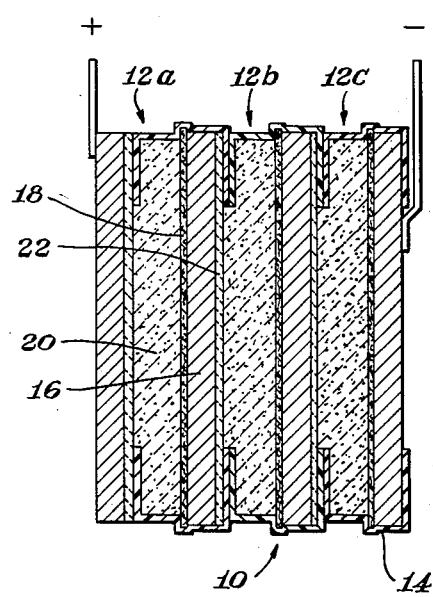
INVENTORS
Percy F. George
Raymond. W. Reid
BY
Griswold & Burdick
ATTORNEYS.

United States Patent Office 2,834,826
Patented May 13, 1958

2,834,826
CONDUCTIVELY COATED ELECTRODES AND METHOD OF MAKING SAME

Raymond W. Reid, Sanford, and Percy F. George, Midland, Mich., assignors to The Dow Chemical Company, Midland, Mich., a corporation of Delaware Application June 30, 1954, Serial No. 440,397

7 Claims. (Cl. 136—100)

This invention relates to a method of providing an electrically conductive fluid impervious coating to metallic electrodes, especially those made of magnesium, and to a primary cell incorporating such a coated electrode.

In so-called stacked cell batteries, the anode of one cell is in juxtaposition with the cathode contact of the next adjacent cell and makes electrical contact therewith. Such battery structures are compact, efficient, and economical to make.

The success of the cell stacking arrangement depends on proper chemical isolation of the anode of each cell from the electrolyte of the next adjacent cell, for if the anode of one cell is exposed to the electrolyte from another cell, that surface of the anode which is exposed to the electrolyte from the adjacent cell becomes corroded. The corroded surface increases the internal resistance of the battery. In addition, a back E. M. F., due to the formation of an unwanted "cell" between the exposed anode surface and adjacent cathode contact further reduces the output potential of the battery.

Several approaches have been made to the problem of isolating the cell anode from the electrolyte of adjacent cells. The surest solution is to provide physically separate cell structures which are connected together by wire, but this solution is both costly and results in a bulky battery structure.

Some attempts have been made to coat the exposed side of the anode with a conductive paint, but the application time is too long for economical production, or the coating is not impervious when the paint dries.

Another approach to the problem has been to apply a conductive cement and a liquid-tight conductive cloth to the exposed anode surface. This arrangement, while successful in the case of zinc anode cells, resulted in a high resistance between cells when the technique was applied to magnesium anode cells.

Other conductive coatings, some of which were successful in zinc anode cells, either failed to protect magnesium anodes from corrosion due to exposure to the electrolyte from adjacent cells or were prohibitively expensive to make or apply.

Accordingly, a principal object of this invention is to provide an improved method of protecting metal electrode surfaces from corrosion.

Another object is to provide an improved, more economical method of applying an electrically conductive coating to a magnesium anode.

An additional object of this invention is to provide an improved, more economical battery using magnesium anode electrodes.

An ancillary object of this invention is to provide an improved, directly connected magnesium anode-cathode contact electrode for use in stacked cell batteries.

In accordance with the invention, the conductive coating is applied to a cleaned surface of a metal electrode by rubbing the metal surface with carbon to produce a carbon coated magnesium surface and then coating the abraded side of the plate with a mixture of molten wax and fine particles of carbon.

When the above method is applied to the coating of battery anodes, the side of the anode which is coated may be utilized as the cathode contact for an adjacent battery cell and provides a fluid-tight electrically conductive coating which electrically connects but chemically isolates two adjacent cells one from another.

The invention, as well as additional objects and advantages thereof, will best be understood when the following detailed description is read in connection with the accompanying drawing, in which the single figure is a diagrammatic sectional view of a flat pack battery utilizing conductively coated electrodes, comprising magnesium for example, in accordance with this invention.

In the drawing, there is shown a flat cell battery 10 in which the individual cells 12a, 12b, and 12c are stacked in juxtaposition one with another. Each cell is contained in a plastic case 14 and comprises a magnesium anode 16, a paper separator 18 disposed against one side of the magnesium anode 16, the cathode mix 20, and the cathode contact 22 which is bonded to the surface of the anode 16 of the next adjacent cell. The cathode mix may comprise a mixture of manganese dioxide and acetylene black plus a suitable electrolyte such as magnesium bromide, for example, as in U. S. Patent No. 2,547,907.

The cathode contact 22 comprises a mixture of wax and graphite particles. A mixture of approximately 50% paraffin and 50% graphite particles has proven satisfactory for application by dipping or brushing, when molten. Such a coating is impervious to fluids, has good electrical conductivity, forms a uniformly thick coating on the magnesium plate by dipping or brushing, adheres tightly to the magnesium, and will withstand reasonably abusive handling during assembly of the cells. Further, large sheets of magnesium may be dip coated and then cut to smaller anode sizes without adversely affecting the bonding between the magnesium and the coating.

The following example is illustrative of the method of applying the coating to a magnesium anode:

First, the magnesium is weak bright pickled in a solution of chromic acid, sodium nitrate and calcium or magnesium fluoride in water. Alternatively, the surface of the metal to be coated may be cleaned by wire brushing, but weak bright pickling is preferred. Also, pickled magnesium sheets may be stored prior to the application of the coating whereas surfaces which have been cleaned by wire brushing must be coated immediately to prevent formation of a hydroxide coating having high electrical resistance.

A suitable pickling solution for anodes comprising magnesium comprises 24 ounces of chromic acid, 4 ounces of sodium nitrate, ⅛ ounce of magnesium fluoride and water to make each gallon of the pickling solution. The metal is immersed in the bath, which is at room temperature, for a period of 15 seconds to 5 minutes and is then rinsed with water.

Secondly, the surface to be coated is abraded with graphite or carbon. The abrading serves to further clean the metallic surface of any films and makes an intimate bond between the graphite or carbon and the metal surface. It has been found that when this step is eliminated, the coating resistance increases substantially. Thus, for many electrode uses this step must be included in the method of applying the conductive coating.

Third, the coating, as a molten mixture of wax and finely divided carbon particles, is applied to the surface to be coated by brush, or by other suitable means. The magnesium is either pre-heated before being coated or is retained in the coating mixture until it reaches the coating temperature (approximately 175° C. in a mixture in which the wax is high melting point paraffin) before being withdrawn therefrom. The coating mixture usually is agitated to insure uniform dispersion of the carbon particles in the mixture. Outstanding results have been obtained when battery grade graphite particles have been used as the conductive material. The coating mixture should contain from 40% to 55% carbon, with 50% giving very favorable results, when high melting point paraffin wax is used.

Fourth, after the coating is formed, carbon particles are sprinkled onto the coating and then the coated magnesium is heated at least to the melting point of the wax of the coating to absorb the carbon into the coating. Thus, the compositon of the final coating comprises more than 50% carbon due to the carbon which is sprinkled on and then "baked" in to the coating. Improved electrical conductivity is best achieved by adding carbon particles after the initial coating has been applied because when large proportions of carbon are used in the coating mixtures, the mixture either does not flow well or results in a non-homogeneous coating.

The steps of rubbing the surface with carbon and dispersing additional carbon into the coating may be dispensed with if low resistance coatings are not required.

An additional step involving a second sprinkling of graphite particles plus a second heating to disperse the particles through the coating may be used. The sprinkling and additional "baking" to disperse the particles through the coating results in a more homogeneous coating with lowered resistance through the coating.

Using the above described method, coating resistances of the order of .1 ohm per sq. inch have been obtained with coatings approximately 1/32 inch thick. Further, the resistance through the coating remained low after storage or after a cell was discharged. Ceresin wax, also known as cerin wax, may be substituted for the paraffin wax, if desired.

In one cell which was successfully tested in which a coating mixture of 50% of a high melting point paraffin wax and 50% battery grade graphite in accordance with this invention was used, the cathode mixture consisted of, by weight, 91% $MnO_2$, 3% $BaCrO_4$, and 6% acetylene black wetted with 300 cc. of 250 g./l. $MgBr_2$+0.2 g./l. $Na_2CrO_4$ electrolyte per 1000 grams of dry depolarizer mix. None of the electrolyte penetrated the wax-graphite coating. The coating mixture was prepared by melting the wax and adding dry graphite. The mixture was applied to the magnesium while molten. The mixture may be applied by brush or other suitable means. The wax coating was about 1/32" thick.

Additional graphite particles were sprinkled onto the coating and "baked" in as previously described, bringing the total graphite to greater than 50% of the final conductive coating.

Thus, this invention provides an improved method of coating a metal surface with a fluid impervious, electrically conductive film which is economical to make and to apply to the surface.

A coating applied in accordance with this invention adheres tightly to the magnesium, withstands bending and shearing well, and has low resistivity. The method of this invention will likewise find use in the coating of copper, zinc, steel and other metals in which a tightly adherent electrically conductive fluid impervious film may be desired. While mixing compositions of approximately 50% wax and 50% carbon particles have been mentioned, other compositions may be used in the practice of the invention. For example, a mixture of 36% graphite and 64% wax-plus-gilsonite mix proved satisfactory. The wax-plus-gilsonite mix comprised, by weight, 48 parts rosin, 48 parts beeswax and 4 parts gilsonite.

In the mixtures cited, the carbon particles were limited to amounts in which the mixture would provide a smooth, thin, homogeneous, fluid impervious coating on the metallic magnesium surface. Additional carbon particles were then sprinkled on and "baked" in to increase the conductivity of the coating.

We claim:

1. The method of applying an electrically conductive, fluid impervious coating to a magnesium surface, comprising weak bright pickling the surface to be coated, abrading said surface with carbon, applying a mixture of molten wax which has particles of battery grade graphite dispersed therein over said surface while said surface is heated at least to the temperature of said mixture, cooling the coated surface to solidify said coating, adding additional particles of battery grade graphite onto said coated surface and heatting said coated surface at least to the melting point of the wax in the mixture to disperse said additional particles into said coating, and again cooling said coated surface.

2. A method in accordance with claim 1, wherein a second application of particles of battery grade graphite is applied to said coated surface and said surface is again heated to disperse said particles therein.

3. The method of applying an electrically conductive, fluid impervious coating to a magnesium surface, comprising cleaning the surface to be coated, abrading said surface with carbon, applying a molten mixture of wax which has particles of battery grade graphite dispersed therein over said surface while said surface is brought to the temperature of said molten wax, and cooling said coated surface.

4. The method of applying an electrically conductive fluid impervious coating to a magnesium surface, comprising weak bright pickling the surface to be coated, abrading said surface with graphite, spreading over said surface a mixture of molten wax which has battery grade graphite particles dispersed therein while said surface is heated at least to the temperature of said molten wax, cooling said coated surface, adding additional graphite particles to said coated surface, and heating said coated surface at least to the melting point of said wax to disperse said additional carbon particles into said coating.

5. The method of applying an electrically conductive, fluid impervious coating to a magnesium surface, comprising cleaning the surface to be coated, abrading the cleaned surface with carbon, applying to said surface a molten mixture comprising 40% to 55% carbon by weight and 60% to 45% high melting point paraffin while said surface is heated at least to the melting point of said paraffin, and cooling said coated surface.

6. The method of applying an electrically conductive, fluid impervious coating to a magnesium surface, comprising cleaning the surface to be coated, abrading the cleaned surface with carbon, applying to said surface a molten mixture comprising 40% to 55% carbon by weight and 60% to 45% ceresin wax while said surface is heated at least to the melting point of said wax, and cooling said coated surface.

7. The method of applying an electrically conductive, fluid impervious coating to a magnesium surface, comprising weak bright pickling the surface to be coated, abrading said surface with graphite, applying to said surface a molten mixture of rosin and bees wax which contains gilsonite and battery grade graphite particles dispersed therein while said surface is heated to a temperature at least as high as that of the molten mixture, cooling said coated surface so as to solidify the mixture, adding additional battery grade graphite particles to the cooled coated surface, and heating said coated surface at least to the melting point of said wax to disperse said additional graphite particles into said coating.

References Cited in the file of this patent

UNITED STATES PATENTS

| | | |
|---|---|---|
| 668,215 | Reed | Feb. 19, 1901 |
| 1,594,810 | Benner et al. | Aug. 3, 1926 |
| 2,138,741 | Kronquest | Nov. 29, 1938 |
| 2,154,312 | MacCallum | Apr. 11, 1939 |

FOREIGN PATENTS

| | | |
|---|---|---|
| 430,660 | Great Britain | June 20, 1935 |
| 680,603 | Great Britain | Oct. 8, 1952 |